US012800707B2

(12) United States Patent
Kozlov et al.

(10) Patent No.: US 12,800,707 B2
(45) Date of Patent: Nov. 17, 2026

(54) RADAR SYSTEM AND METHOD FOR DETECTING AN OBJECT IN SPACE

(71) Applicant: NEURA ROBOTICS GMBH, Metzingen (DE)

(72) Inventors: Dmitrii Kozlov, Wannweil (DE); Josef Siraky, Donaueschingen (DE); David Reger, Metzingen (DE)

(73) Assignee: Neura Robotics GmbH, Metzingen (DE)

( * ) Notice: Subject to any disclaimer, the term of this patent is extended or adjusted under 35 U.S.C. 154(b) by 226 days.

(21) Appl. No.: 18/692,722

(22) PCT Filed: Sep. 16, 2022

(86) PCT No.: PCT/EP2022/075726
§ 371 (c)(1),
(2) Date: Mar. 15, 2024

(87) PCT Pub. No.: WO2023/041683
PCT Pub. Date: Mar. 23, 2023

(65) Prior Publication Data
US 2025/0138140 A1 May 1, 2025

(30) Foreign Application Priority Data
Sep. 16, 2021 (DE) ......................... 102021124012.3

(51) Int. Cl.
*G01S 7/41* (2006.01)
*G01S 7/02* (2006.01)

(52) U.S. Cl.
CPC ................ *G01S 7/027* (2021.05); *G01S 7/41* (2013.01)

(58) Field of Classification Search
CPC .................................. G01S 7/027; G01S 7/41
See application file for complete search history.

(56) References Cited

U.S. PATENT DOCUMENTS 11,550,035 B2 * 1/2023 Fields ....................... G01S 7/02
12,117,520 B1 * 10/2024 Armstrong-Crews ....................... G01S 13/60
(Continued)

FOREIGN PATENT DOCUMENTS

CN 212580080 U 2/2012
CN 20687687 U 1/2018
(Continued)

OTHER PUBLICATIONS

Office action issued by the German Patent and Trademark Office on May 16, 2022, in corresponding application.
(Continued)

*Primary Examiner* — Bernarr E Gregory
*Assistant Examiner* — Isabella A Edrada
(74) *Attorney, Agent, or Firm* — Nath, Goldberg & Meyer; Jerald L. Meyer

(57) ABSTRACT

The invention relates to a radar system (100). A first localization radiation lobe (1.3) can be generated by means of a first localization sensor (1.1), and a second localization radiation lobe (10.3) can be generated by means of the second localization sensor (10.1). The localization radiation lobes (1.3, 10.3) are designed to have the shape of a fan with a respective main fan plane (1.4, 10.4) in each case. A first main fan plane (1.4) of the first localization radiation lobe (1.3) is arranged at a first angle of incidence (1.5) relative to an imaginary base plane (30) arranged parallel to a movement direction (3.7), and a second main fan plane (10.4) of the second localization radiation lobe (10.3) is arranged at a second angle of incidence (10.5) relative to the base plane (30), said first angle of incidence (1.5) and second angle of incidence (10.5) differing. The invention also relates to a method (800) for detecting an object (8) in space, wherein a reflection elevation angle (54) of the reflected localization
(Continued)

Figure 1:
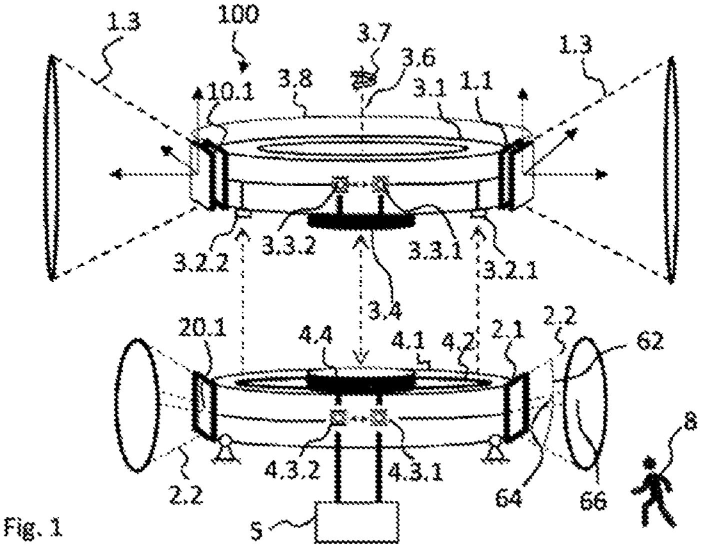

signals (71.1, 71.2) is determined using the ratio of the signal offset (74) to the sensor offset (3.8).

13 Claims, 3 Drawing Sheets

(56) References Cited

U.S. PATENT DOCUMENTS

| | | | | |
|---|---|---|---|---|
| 2009/0106989 | A1 | 4/2009 | Kamizono et al. | |
| 2018/0267160 | A1* | 9/2018 | Slemp | G01S 13/931 |
| 2018/0313952 | A1* | 11/2018 | Giere | G01S 7/0232 |
| 2023/0313938 | A1* | 10/2023 | Buchi | F16M 11/123 701/2 |

FOREIGN PATENT DOCUMENTS

| | | | |
|---|---|---|---|
| CN | 206876871 | U | 1/2018 |
| CN | 212828136 | U | 3/2021 |
| DE | 1115793 | A | 10/1961 |
| DE | 19814776 | A1 | 10/1999 |
| EP | 3343244 | A1 | 7/2018 |
| JP | H05172937 | A | 7/1993 |
| JP | 2009-109210 | A | 5/2009 |
| JP | 2009229458 | A | 10/2009 |
| JP | 2011511262 | A | 4/2011 |
| JP | 5172937 | B2 | 1/2013 |
| JP | 201699305 | A | 5/2016 |
| JP | 2017-096767 | A | 6/2017 |
| JP | 2020511666 | A | 4/2020 |
| JP | 2021-511483 | A | 5/2021 |
| JP | 2021092425 | A | 6/2021 |
| JP | 2022546591 | A | 11/2022 |
| KR | 20170062149 | A | 6/2017 |
| WO | 2019003194 | A1 | 1/2019 |
| WO | 2020/068416 | A1 | 4/2020 |

OTHER PUBLICATIONS

Office action issued by the Japanese Patent Office on May 20, 2025, in parallel pending Japanese patent application No. 2024-516917, with English translation.

Office action issued by the Taiwanese Patent Office on May 13, 2025, in parallel pending Taiwanese patent application No. 111135130, with English translation.

* cited by examiner

RADAR SYSTEM AND METHOD FOR DETECTING AN OBJECT IN SPACE

This is a National Phase Application filed under 35 U.S.C. 371 as a national stage of PCT/EP2022/075726, filed Sep. 16, 2022, an application claiming the benefit of German Application No. 10 2021 124 012.3 filed Sep. 16, 2021, the content of each of which is hereby incorporated by reference in its entirety.

The invention relates to a radar system and a method for detecting an object in space.

To detect, in particular to localize, objects in space, radar sensors are used, which are arranged on a rotor and are therefore arranged to be rotatable about an axis of rotation. The azimuth angle of a reflected signal captured by the radar sensor can be detected via the position of the rotor. The azimuth angle corresponds to the azimuth position of an object in space from which the signal is reflected. To detect the elevation angle, it is known to use a radar sensor with several receiving antennas arranged at a distance from one another. The elevation angle of the reflected signal can be detected through the phase shifts with which a reflected signal is captured at the various receiving antennas and the known distances between the receiving antennas. In addition, the elevation angle can be detected using the so-called phased array method, in which several transmitting antennas are used and a signal having a specific phase shift is emitted from each transmitting antenna. This allows the propagating transmission beam to be deflected in terms of its direction of propagation.

US 2018/0 267 160 A1 is cited as prior art.

A disadvantage of the known systems and methods is that a large number of transmitting and/or receiving antennas are required to detect the elevation angle, which is associated with a high level of system complexity. The processing of the transmission and receiving signals is correspondingly complex. An improvement in the resolution of a system is associated with a further increase in complexity. Conventional radar systems are therefore expensive.

The invention is therefore based on the object of providing a radar system with which an object in space can be reliably and precisely detected and which has low development, manufacturing and operating costs.

The invention is also based on the object of providing a method with which an object in space can be reliably and precisely detected and which is easy to implement.

The object is achieved according to the invention by a radar system with the features of claim 1, a method, and a radar system.

Advantageous configurations and refinements of the invention are set forth in the dependent claims.

A radar system according to the invention comprises a first localization sensor, and a second localization sensor, wherein the first localization sensor and the second localization sensor are designed as radar sensors, wherein the first localization sensor and the second localization sensor are arranged on a common carrier offset in a movement direction that they have a sensor offset, with the carrier being arranged to be movable in the movement direction. In addition, a radar system according to the invention has a means for detecting localization sensor positions of the localization sensors, wherein a first localization radiation lobe can be generated by means of the first localization sensor and a second localization radiation lobe can be generated by means of the second localization sensor, the localization radiation lobes being designed to have the shape of a fan with a respective main fan plane in each case, wherein a first main fan plane of the first localization radiation lobe is arranged at a first angle of incidence relative to an imaginary base plane arranged parallel to the movement direction and a second main fan plane of the second localization radiation lobe is arranged at a second angle of incidence relative to the base plane, said first angle of incidence and second angle of incidence differing. The term movement direction is preferably used such that the movement direction also comprises the opposite direction in each case.

The sensor offset between the first localization sensor and the second localization sensor preferably results in the first localization sensor and the second localization sensor being arranged on the carrier offset in the movement direction. The movement direction is preferably arranged horizontally.

Due to their fan shape, the localization radiation lobes are preferably very narrow in one direction and very wide in a direction perpendicular thereto. The respective main fan plane is preferably arranged parallel to the plane which is defined by a transmission direction and the direction in which the respective localization radiation lobe is designed to be wide. Because the first angle of incidence and the second angle of incidence differ, the offset arranged between the first localization radiation lobe and the second localization radiation lobe preferably depends in particular on an elevation angle.

To describe spatial arrangements and movements, the terms "elevation" and "azimuth" are preferably used herein. Elevation preferably describes a position in a direction of rotation about a horizontal axis. In general, the elevation direction is preferably used herein to describe a direction arranged perpendicular to the movement direction. Azimuth preferably describes the position in a direction of rotation about a vertical axis. In general, the azimuth direction is preferably used here to describe a direction of rotation about an axis of rotation that is arranged perpendicular to the movement direction. Particularly preferably, the movement direction is arranged horizontally, so that azimuth can be used to describe an orientation in the horizontal direction, and elevation can be used to describe an orientation in the vertical direction.

The carrier is preferably designed as a rotor which is rotatably arranged relative to the stator about an axis of rotation, so that the movement direction is designed to be rotary. The axis of rotation is preferably arranged perpendicular to the movement direction.

In a preferred embodiment of the invention, the means of detecting localization sensor positions is designed as an encoder system. The encoder system can be designed such that the arrangement of the carrier, in particular relative to the stator, can be captured. This allows the localization sensor positions of the localization sensors to be detected by means of the encoder system. The encoder system is preferably designed as a rotary encoder. The encoder system is preferably arranged on the radar system such that at least one reading head is arranged on the carrier and a material measure is arranged on the stator. The encoder system particularly preferably has a first reading head and a second reading head. As a result, the encoder system can be designed to be at least partially redundant.

In a preferred embodiment of the invention, the localization radiation lobes are arranged such that the first main fan plane and the second main fan plane are inclined in opposite directions relative to the base plane with respect to the movement direction. This allows the dependence of the offset of the localization radiation lobes on the elevation angle to be increased.

Particularly preferably, the first angle of incidence and the second angle of incidence are of the same magnitude. This allows the structure of the radar system and the data evaluation in particular to be simplified.

The localization radiation lobes are preferably designed such that they each have a main opening angle and a transverse opening angle arranged perpendicular thereto, the main opening angle being at least 90°, preferably at least 120°, and the ratio of the main opening angle to the transverse opening angle being more than 5:1, preferably more than 10:1. This means that each of the localization radiation lobes can have an elliptical or approximately rectangular cross section. The main opening angle preferably describes the opening angle of the localization radiation lobes parallel to the respective main fan plane. The transverse opening angle is preferably arranged perpendicular to the main opening angle. Locating objects in space requires in particular a high resolution and an update rate as high as possible. This can be achieved by the rotatable arrangement and the geometry of the localization radiation lobes. In particular, due to the relatively narrow cross section of each localization radiation lobe, the localization sensors can achieve a high resolution.

In a preferred embodiment of the invention, the first localization sensor is designed to capture a first reflected localization signal, and the second localization sensor is designed to capture a second reflected localization signal, a signal offset being arranged between the first reflected localization signal and the second reflected localization signal, and wherein the radar system has a localization computing unit that is designed to determine a reflection elevation angle using the ratio of the signal offset to the sensor offset. The elevation angle of the reflected localization signals is preferably referred to as the reflection elevation angle. The respective reflected localization signal is preferably the signal that is reflected by an object in space due to the localization radiation lobe emitted from the corresponding localization sensor. Here, the first reflected localization signal and the second reflected localization signal are preferably reflected by the same reflecting object. The signal offset is preferably formed between a first signal position and a second signal position. The carrier position corresponding to the respective signal position can preferably be captured using the means for detecting localization sensor positions. The localization sensor position of the first localization sensor when capturing the first reflected localization signal is preferably referred to as the first signal position and the localization sensor position of the second localization sensor when capturing the second reflected localization signal is accordingly preferably referred to as the second signal position.

The signal offset can accordingly be formed between the carrier position when capturing the first reflected localization signal by means of the first localization sensor and the carrier position when capturing the second reflected localization signal by means of the second localization sensor. The respective carrier position can be captured using the means for detecting localization sensor positions, in particular using the encoder system. In particular, if the sensor offset and the angle of incidence are known, the localization computing unit can determine the reflection elevation angle using the ratio of the signal offset to the sensor offset.

Preferably, the localization computing unit is designed to detect a reflection position value and a distance value from the first reflected localization signal and/or the second reflected localization signal, a localization data set being formed by the reflection elevation angle, the reflection position value and the distance value. The position of the respective reflected localization signal in the movement direction can be referred to as the reflection position value. The reflection position value generally preferably differs from the localization sensor position of the localization sensor that receives the associated reflected localization signal. The reflection position value can be determined in particular from the localization sensor position of the localization sensor receiving the associated reflected localization signal and the angle of incidence of the respective main fan plane. The detection of the localization sensor position of the receiving localization sensor can be detected in particular based on the carrier positions captured by the encoder system. To determine the distance value, in particular the transit time between emitting the localization signal and capturing the reflected localization signal can be used. The distance value can describe the distance of the reflecting object from the respective localization sensor. The position of the reflecting object in space can preferably be clearly described by means of a localization data set.

The localization computing unit is preferably connected to the localization sensors and the means for detecting localization sensor positions. The localization computing unit is preferably arranged on the carrier. The radar system can have a rotary feedthrough to connect supply and data lines between the carrier and the stator.

In addition, the radar system can have a first localization computing unit and a second localization computing unit as redundancy and to increase the reliability of the radar system. Preferably, the first localization computing unit and the second localization computing unit are designed identically.

In a preferred embodiment of the invention, the localization computing unit is designed to compare a first localization data set with one second localization data set and to further process only data that differ. Further processing can in particular comprise the transmission of the data. The environment scanned with the localization sensors can have static objects relative to the localization sensor, the reflected localization signal of which does not change or changes insignificantly over time. By comparing the second localization data set with the first localization data set, the static objects can be separated from objects moving relative to the localization sensors. In addition, the comparison can reduce the amount of data to be further processed. This allows the dynamics and accuracy of the radar system in particular to be increased. Preferably, the localization computing unit is designed such that a comparison is carried out with every revolution of the rotor.

In a refinement of the invention, the radar system has at least one identification sensor for identifying an object, wherein an identification radiation lobe can be generated by means of the at least one identification sensor, and wherein the at least one identification sensor is designed as a fixed radar sensor. The identification of an object is preferably carried out by means of the characteristic radar signature generated by an object. The radar signature can comprise a spectrum of Doppler frequencies, the so-called Doppler signature, which can be used to distinguish between living and non-living objects at a high resolution. The high resolution with regard to the Doppler signature requires a comparatively long observation time, which can be contrary in particular to the high update rate for localizing the object. Because the radar system has the rotatable localization sensors and preferably the at least one fixed identification sensor, the radar system can provide ideal conditions for simultaneous localization and identification of an object in space.

The identification radiation lobe preferably has a main opening angle of at least 90°, particularly preferably of at least 120°, and the identification radiation lobe preferably has a transverse opening angle of at least 90°, particularly preferably of at least 120°. The identification radiation lobe therefore preferably has a circular or approximately square cross section. Furthermore, the main opening angle and the transverse opening angle of the identification radiation lobe are comparatively large, so that a large area can be captured by means of an identification sensor. Preferably, the main opening angle of the identification radiation lobe is arranged in the elevation direction, and the transverse opening angle of the identification radiation lobe is arranged in the azimuth direction.

The at least one identification sensor is preferably arranged on the stator. This allows a simple and uniform structure of the radar system to be realized.

In a refinement of the invention, the radar system has a first identification sensor and a second identification sensor, which are preferably arranged on the stator with an offset of 180° which is particularly preferably arranged in the movement direction. This allows objects to be identified over a large area. Furthermore, the radar system can have additional identification sensors in order to be able to cover an even larger area. The identification radiation lobes of the various identification sensors can be designed to be at least approximately identical or different.

The radar system can have at least one identification computing unit that is designed to identify a radar signature of a reflected identification signal. For this purpose, the radar system can in particular be designed to assign the Doppler signature of the reflected identification signal to a specific object. In particular, the identification computing unit can be designed to compare the radar signatures of the reflected identification signals with a reference database. The at least one identification computing unit is preferably connected in particular to the at least one identification sensor. The at least one identification computing unit can be arranged on the stator.

In addition, the radar system can have a first identification computing unit and a second identification computing unit as further redundancy and to further increase the reliability of the radar system.

The radar system can have a central computing unit which is designed to assign the reflected identification signal to the reflected localization signals. This allows the radar system to locate and simultaneously identify an object in space with high resolution. For this purpose, the central computing unit is preferably connected to at least one localization computing unit and the at least one identification computing unit. In order to be able to assign the reflected identification signal to the reflected localization signals, the at least one identification sensor is preferably designed such that it can at least approximately localize an object based on the reflected identification signal. Preferably, the at least one identification sensor has a transmitting antenna and at least two receiving antennas. As a result, the reflected identification signal can be processed using a beamforming method, preferably by the at least one identification computing unit. The localization of the object based on the reflected identification signal can be significantly less precise than the localization based on the reflected localization signals.

A method for determining an object in space is carried out by means of a first radar sensor designed as a localization sensor and by means of a second radar sensor designed as a localization sensor, the first localization sensor and the second localization sensor being arranged on a common carrier offset in a movement direction such that they have a sensor offset, wherein the carrier is arranged to be movable in the movement direction. During a cycle of movement of the carrier, the following steps are carried out:

- emitting a first localization radiation lobe by means of the first localization sensor and a second localization radiation lobe by means of the second localization sensor, wherein the localization radiation lobes are designed to have the shape of a fan with a respective main fan plane in each case, wherein a first main fan plane of the first localization radiation lobe is arranged at a first angle of incidence relative to an imaginary base plane arranged parallel to the movement direction and a second main fan plane of the second localization radiation lobe is arranged at a second angle of incidence to the base plane, and the first angle of incidence and the second angle of incidence differing,
- capturing a first reflected localization signal by means of the first localization sensor and an associated first signal position,
- capturing a second reflected localization signal by means of the second localization sensor and an associated second signal position,
- detecting the signal offset between the first signal position and the second signal position,
- determining a reflection elevation angle using the ratio of the signal offset to the sensor offset.

Preferably, the aforementioned steps are carried out several times during a movement cycle of the carrier. The first signal position and the second signal position are preferably captured by means of an encoder system. Preferably, the carrier is rotatably arranged, and the movement cycle is formed by a revolution of the carrier.

If there is a feature in the description of the radar system explained above that corresponds to one of the present features mentioned with regard to the method and has an identical name, the explanations described with regard to the radar system preferably apply in the same way to the present features of the method. For example, the above statements regarding the localization sensors or the localization radiation lobes of the radar system can apply correspondingly to the localization sensors or the localization radiation lobes of the method.

In a preferred embodiment of the method, a reflection position value and a distance value are detected from the first reflected localization signal and/or the second reflected localization signal, a localization data set being formed by the reflection elevation angle, the reflection position value and the distance value.

The method is preferably designed such that the carrier carries out several movement cycles, with a second localization data set being compared with a first localization data set having the same reflection azimuth angle. According to the above description of the radar system, the amount of data to be further processed can be reduced and the identification of moving objects can also be simplified.

The method is preferably designed such that it additionally has the following steps:

- emitting an identification radiation lobe by means of a fixed radar sensor designed as an identification sensor,
- capturing a reflected identification signal having a radar signature,
- identifying the radar signature, assigning the reflected identification signal to the reflected localization signals.

The radar signature can comprise a spectrum of Doppler frequencies, the so-called Doppler signature, which may enable distinguishing between living and non-living objects at a high resolution. The radar signature is preferably identified using the Doppler signature. Identifying the radar signature can in particular comprise comparing the reflected identification signals with a reference database.

In order to be able to assign the reflected identification signal to the reflected localization signals, the reflecting object can be at least approximately localized based on the reflected identification signal. For this purpose, the reflected identification signal is preferably processed by means of a beamforming method. In doing so, the localization of the object based on the reflected identification signal can be significantly less precise than the localization based on the reflected localization signals.

The radar system described above is preferably designed to carry out the method explained.

Figure 2:
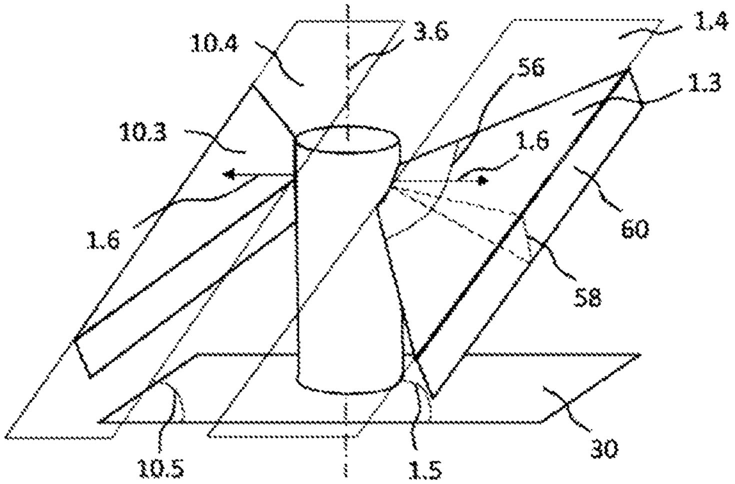
Figure 3:
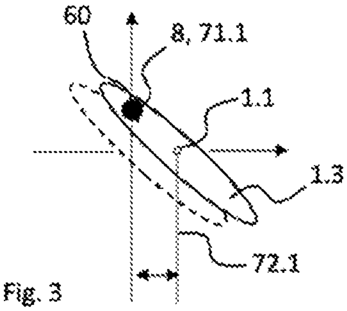
Figure 4:
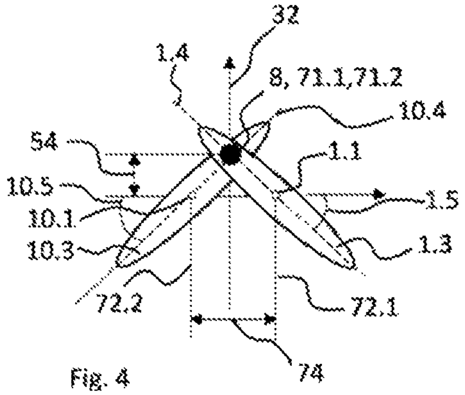
Figure 5:
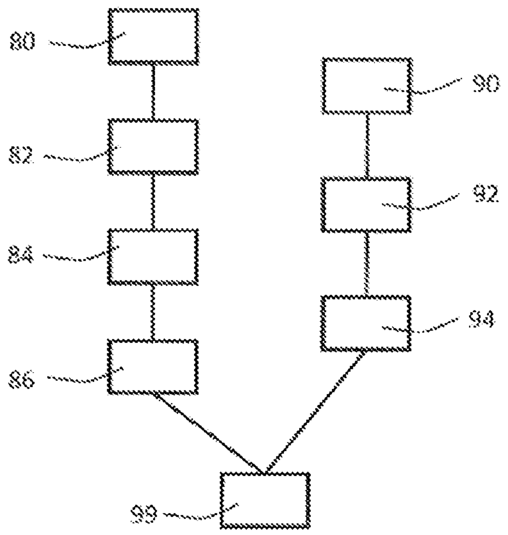

An exemplary embodiment of the invention is explained using the following figures. In the figures:

FIG. 1 shows a schematic representation of an exemplary embodiment of a radar system, FIG. 2 shows a schematic representation of a rotor with a first localization radiation lobe and a second localization radiation lobe, FIG. 3 shows a schematic representation of an arrangement of a localization radiation lobe and an object to be detected, FIG. 4 shows a schematic representation of an arrangement of two localization radiation lobes and an object to be detected, FIG. 5 shows a schematic representation of a method for detecting an object in space.

The same reference numerals are used for identical and functionally identical parts.

FIG. 1 shows a radar system 100 with a first localization sensor 1.1 and a second localization sensor 10.1, wherein first localization sensor 1.1 and second localization sensor 10.1 are designed as radar sensors. First localization sensor 1.1 and the second localization sensor 10.1 are arranged and are offset in the movement direction 3.7 on a common carrier 3.1 such that they have a sensor offset 3.8. Preferably, carrier 3.1 is arranged rotatably about a axis of rotation 3.6 relative to a stator 4.1. A first localization radiation lobe 1.3 can be generated by means of first localization sensor 1.1, and a second localization radiation lobe 10.3 can be generated by means of the second localization sensor. Sensor offset 3.8 between first localization sensor 1.1 and second localization sensor 10.1 preferably results in first localization sensor 1.1 and second localization sensor 10.1 being arranged on carrier 3.1 offset in movement direction 3.7. Axis of rotation 3.6 is preferably arranged vertically.

In addition, radar system 100 can have an encoder system for detecting localization sensor positions of the localization sensors 1.1, 10.1. The encoder system can be designed to be able to capture the arrangement of carrier 3.1 relative to stator 4.1. This allows the localization sensor positions of localization sensors 1.1, 10.1 to be detected by means of the encoder system. The encoder system is preferably arranged on radar system 100 such that a first reading head 3.2.1 and a second reading head 3.2.2 are arranged on rotor 3.1 and a material measure 4.2 is arranged on stator 4.1.

As shown in FIG. 2, the localization radiation lobes 1.3, 10.3 are designed to have the shape of a fan with a respective main fan plane in each case, a first main fan plane 1.4 of the first localization radiation lobe 1.3 being arranged at a first angle of incidence 1.5 relative to an imaginary base plane 30 arranged parallel to movement direction 3.7, and a second main fan plane 10.4 of the second localization radiation lobe 10.3 is arranged at a second angle of incidence 10.5 to base plane 30.

Due to their fan shape, localization radiation lobes 1.3, 10.3 are preferably designed to be very narrow in one direction and very wide in a direction perpendicular thereto. Here, the respective main fan plane 1.4, 10.4 is preferably arranged parallel to the plane which is defined by a transmission direction 1.6 and the direction in which respective localization radiation lobe 1.3, 10.3 is designed to be wide.

The localization radiation lobes 1.3, 10.3 are arranged such that first angle of incidence 1.5 and second angle of incidence 10.5 differ. As shown in FIG. 2, localization radiation lobes 1.3, 10.3 can, for example, be arranged such that first main fan plane 1.4 and second main fan plane 10.4 are inclined in opposite directions relative to base plane 30 with respect to movement direction 3.7. In particular, first main fan plane 1.4 and second main compartment plane 10.4 can be inclined in opposite directions relative to base plane 30 with respect to axis of rotation 3.6. Particularly preferably, first angle of incidence 1.5 and second angle of incidence 10.5 are here of the same magnitude.

Localization radiation lobes 1.3, 10.3 are preferably designed such that they each have a main opening angle 56 and a transverse opening angle 58 arranged perpendicular thereto, the main opening angle 56 being at least 90°, preferably at least 120°, and the ratio of main opening angle 56 to transverse opening angle 58 of localization radiation lobes 1.3, 10.3 being each more than 5:1, preferably more than 10:1. As a result, each of localization radiation lobes 1.3, 10.3 can have an elliptical or approximately rectangular cross section 60 (see in particular FIGS. 2 and 3). Main opening angle 56 preferably describes opening angle of localization radiation lobes 1.3, 10.3 parallel to the respective main fan plane 1.4, 10.4. Transverse opening angle 58 is preferably arranged perpendicular to main opening angle 56.

As shown in FIG. 4, a reflecting object 8 can be captured by first localization radiation lobe 1.3 and second localization radiation lobe 10.3. Preferably, a first reflected localization signal 71.1 or a second reflected localization signal 71.2 is generated by object 8. Preferably, first localization sensor 1.1 is designed to capture first reflected localization signal 71.1, and second localization sensor 10.3 is designed to capture the second reflected localization signal 71.2.

Here, FIG. 4 shows a representation in which capturing first reflected localization signal 71.1 by first localization sensor 1.3 and capturing second reflected localization signal 71.2 by second localization sensor 10.3 are superimposed such that first reflected localization signal 71.1 and second reflected localization signal 71.2 come to lie congruently with object 8 on the ordinate of the coordinate system shown arranged in elevation direction 32. Here, it is evident that a signal offset 74 can be arranged between a first signal position 72.1, at which first localization sensor 1.1 captures first reflected localization signal 71.1, and a second signal position 72.2, at which second localization sensor 10.1 captures second reflected localization signal 71.2. The first signal position 72.1 is preferably the localization sensor position of first localization sensor 1.1 when capturing first reflected localization signal 71.1 and second signal position 72.2 is accordingly the localization sensor position of second localization sensor 10.1 when capturing second reflected localization signal 71.2.

Radar system 100 can have a first localization computing unit 3.3.1 shown in FIG. 1, which is designed to determine a reflection elevation angle 54 shown in FIG. 4 using the ratio of signal offset 74 to sensor offset 3.8. Especially if sensor offset 3.8 and the angles of incidence 1.5, 10.5 are known, first localization computing unit 3.3.1 can determine reflection elevation angle 54 using the ratio of signal offset 74 to sensor offset 3.8.

First localization computing unit 3.3.1 is preferably connected to localization sensors 1.1., 10.1 and the encoder system. As shown in FIG. 1, first localization computing unit 3.3.1 is preferably arranged on carrier 3.1. Radar system 100 can have a rotary feedthrough with a rotor-side rotary feedthrough part 3.4 and a stator-side rotary feedthrough part 4.4 for carrying out supply and data lines between carrier 3.1 and stator 4.1. In addition, radar system 100 can have a second localization computing unit 3.3.2 as redundancy. First localization computing unit 3.3.1 and second localization computing unit 3.3.2 are preferably designed identically. First localization computing unit 3.3.1 and second localization computing unit 3.3.2 can be designed to compare a first localization data set with a second localization data set and to further process only differing data.

Radar system 100 can have a first identification sensor 2.1 and a second identification sensor 20.1 for identifying object 8, wherein an identification radiation lobe 2.2 can be generated by means of the identification sensors 2.1, 20.1. Here, identification radiation lobes 2.2 of first identification sensor 2.1 and second identification sensor 20.1 can be designed to be at least approximately identical or different. Identification sensors 2.1, 20.1 are preferably designed as fixed radar sensors and arranged on stator 4.1. Preferably, first identification sensor 2.1 and second identification sensor 20.1 are arranged on the rotor with an offset of 180°. This allows objects 8 to be identified over a large area.

Identification radiation lobes 2.2 preferably have a main opening angle 62 of at least 90°, particularly preferably of at least 120°, and a transverse opening angle 64 of at least 90°, particularly preferably of at least 120°. Thus, identification radiation lobes 2.2 preferably have a circular or approximately square cross section 66. Furthermore, elevation opening angle 62 and transverse opening angle 64 of identification radiation lobes 2.2 are therefore comparatively large, so that a large area can be captured by means of one of identification sensors 2.1, 20.1.

Radar system 100 can have a first identification computing unit 4.3.1 and a second identification computing unit 4.3.2, each of identification computing units 4.3.1, 4.3.2 being designed to identify a radar signature of a reflected identification signal. Identification computing units 4.3.1, 4.3.2 are preferably designed identically. For this purpose, radar system 100 can in particular be designed to assign the Doppler signature of the reflected identification signal to a specific object. In particular, identification computing units 4.3.1, 4.3.2 can be designed to compare the radar signatures of the reflected identification signals with a reference database. Identification computing units 4.3.1, 4.3.2 are preferably connected in particular to identification sensors 2.1, 20.1. Identification computing units 4.3.1, 4.3.2 can be arranged on stator 4.1.

Radar system 100 can have a central computing unit 5, which is designed to assign the reflected identification signal to reflected localization signal. This allows radar system 100 to locate an object 8 in space with high resolution and at the same time identify it. For this purpose, central computing unit 5 is preferably connected to localization computing units 3.3.1, 3.3.2 and identification computing units 4.3.1, 4.3.2. In order to be able to assign the reflected identification signal to reflected localization signal, identification sensors 2.1, 20.1 are designed so that they can at least approximately localize an object 8 based on the reflected identification signal. Preferably, for this purpose, identification sensors 2.1, 20.1 each have a transmitting antenna and at least two receiving antennas. As a result, the reflected identification signal can be processed by means of a beamforming method, preferably by identification computing units 4.3.1, 4.3.2.

FIG. 5 shows a schematic representation of a method 800 with several method steps for detecting an object in space. Preferably, radar system 100 shown in FIG. 1 is designed to carry out the method.

In a first method step 80, first localization radiation lobe 1.3 can be emitted by means of first localization sensor 1.1, and second localization radiation lobe 10.3 can be emitted by means of second localization sensor 10.1. In a second method step 82, first reflected localization signal 71.1 is preferably captured by means of first localization sensor 1.1, and the associated first signal position 72.1 is preferably captured by means of the encoder system. A corresponding arrangement is shown in FIG. 3. In a third method step 84, second reflected localization signal 71.2 can be captured by means of the second localization sensor 10.1, and the associated second signal position 72.2 can preferably be captured by means of the encoder system. The arrangement of second signal position 72.2 is shown in FIG. 4.

In a fourth method step 86, the signal offset 74 between the first signal position 72.1 and the second signal position 72.2 can be detected. Preferably in a fifth method step 88, reflection elevation angle 54 is determined using the ratio of signal offset 74 to sensor offset 3.8.

Preferably, first method step 80 to fourth method step 86 are carried out several times during a movement cycle, in particular one revolution, of carrier 3.1.

Method 800 is preferably designed in such a way that in a fifth method step 90 identification radiation lobe 2.2 is emitted by means of at least one of identification sensors 2.2, 20.2. In a sixth method step 92, a radar signature of a reflected identification signal can then be captured, which can be identified in a seventh method step 94. The radar signature is preferably identified using the Doppler signature. Identifying the radar signature can in particular comprise comparing the reflected identification signals with a reference database. Preferably, fifth method step 90 to seventh method step 94 are arranged parallel to first method step 80 to fourth method step 86.

In an eighth method step 99, the reflected identification signal can be assigned to reflected localization signals 71.1, 71.2. In order to be able to assign the reflected identification signal to reflected localization signal 71.1, 71.2, reflecting object 8 can be at least approximately localized based on the reflected identification signal. For this purpose, the reflected identification signal is preferably processed by means of a beamforming method.

LIST OF REFERENCE NUMERALS

1.1 first localization sensor
1.3 localization radiation lobe
1.4 first main fan plane
1.5 first angle of incidence
1.6 transmission direction
2.1 first identification sensor
2.2 identification radiation lobe
3.1 carrier
3.2.1 first reading head

3.2.2 second reading head
3.3.1 first localization computing unit
3.3.2 second localization computing unit
3.4 rotor-side rotary feedthrough part
3.6 axis of rotation
3.7 movement direction
3.8 sensor offset
4.1 stator
4.2 material measure
4.4 stator-side rotary feedthrough part
8 object
10.1 second localization sensor
10.3 second localization radiation lobe
10.4 second main fan plane
10.5 second angle of incidence
20.1 second identification sensor
30 base plane
32 elevation direction
54 reflection elevation angle
56 main opening angle of the localization radiation lobe
58 transverse opening angle of the localization radiation lobe
60 cross section of the localization radiation lobe
62 main opening angle of the identification radiation lobe
64 transverse opening angle of the identification radiation lobe
66 cross section of the identification radiation lobe
71.1 first reflected localization signal
71.2 second reflected localization signal
72.1 first signal position
72.2 second signal position
74 signal offset
80 first method step
82 second method step
84 third method step
86 fourth method step
90 fifth method step
92 sixth method step
94 seventh method step
99 eighth method step
100 radar system
800 method

The invention claimed is:

1. A radar system (100) with the following features:
a first localization sensor (1.1), and
a second localization sensor (10.1),
wherein the first localization sensor (1.1) and the second localization sensor (10.1) are designed as radar sensors,
wherein the first localization sensor (1.1) and the second localization sensor (10.1) are arranged on a common carrier (3.1) offset in a movement direction (3.7) such that they have a sensor offset (3.8), the carrier (3.1) being arranged movably in the movement direction (3.7),
a means for detecting localization sensor positions of the localization sensors (1.1, 10.1),
wherein a first localization radiation lobe (1.3) can be generated by means of the first localization sensor (1.1) and a second localization radiation lobe (10.3) can be generated by means of the second localization sensor (10.1),
wherein the localization radiation lobes (1.3, 10.3) are designed to have the shape of a fan with a respective main fan plane in each case (1.4, 10.4), wherein a first main fan plane (1.4) of the first localization radiation lobe (1.3) is arranged at a first angle of incidence (1.5) relative to an imaginary base plane (30) arranged parallel to the movement direction (3.7) and a second main fan plane (10.4) of the second localization radiation lobe (10.3) is arranged at a second angle of incidence (10.5) relative to the base plane (30),
wherein the first angle of incidence (1.5) and the second angle of incidence (10.5) differ, and
wherein the means for detecting localization sensor positions is designed as an encoder system.

2. The radar system according to claim 1,
characterized in that
the carrier (3.1) is designed as a rotor, which is arranged to be rotatable relative to a stator (4.1) about an axis of rotation (3.6), so that the movement direction (3.7) is designed to be rotary.

3. The radar system according to claim 1,
characterized in that
the localization radiation lobes (1.3, 10.3) are arranged such that the first main fan plane (1.4) and the second main fan plane (10.4) are inclined in opposite directions relative to the base plane (30) with respect to the movement direction.

4. The radar system according to claim 1,
characterized in that
the first angle of incidence (1.5) and the second angle of incidence (10.5) are of the same magnitude.

5. The radar system according to claim 1,
characterized in that
the localization radiation lobes (1.3, 10.3) each have a main opening angle (56) and a transverse opening angle (58) arranged perpendicular thereto, the main opening angle (56) being at least 90°, preferably at least 120° and the ratio of the main opening angle (56) to the transverse opening angle (58) is more than 5:1, preferably more than 10:1.

6. The radar system according to claim 1,
characterized in that
the first localization sensor (1.1) is designed to capture a first reflected localization signal (71.1), and the second localization sensor (10.1) is designed to capture a second reflected localization signal (71.2), and wherein a signal offset (74) is arranged between the first reflected localization signal (71.1) and the second reflected localization signal (71.2), and that the radar system (100) has a localization computing unit (3.3.1, 3.3.2) which is designed to determine a reflection elevation angle (54) using the ratio of the signal offset (74) to the sensor offset (3.8).

7. The radar system according to claim 6,
characterized in that
the localization computing unit (3.3.1, 3.3.2) is designed to detect a reflection position value and a distance value from the first reflected localization signal (71.1) and/or the second reflected localization signal (71.2), wherein a localization data set is formed by the reflection elevation angle, the reflection position value and the distance value.

8. The radar system according to claim 7,
characterized in that
the localization computing unit (3.3.1, 3.3.2) is designed to compare a first localization data set with a second localization data set, and to further process only differing data.

9. The radar system according to claim 1,
characterized in that
the radar system (100) has at least one identification sensor (2.1, 20.1) for identifying an object (8), an identification radiation lobe (2.2) being able to be generated by means of the at least one identification sensor (2.1, 20.1), and wherein the at least one identification sensor (2.1, 20.1) is designed as a fixed radar sensor.

10. The radar system according to claim 9, characterized in that the identification radiation lobe (2.2) has a main opening angle (62) of at least 90°, preferably of at least 120°, and the identification radiation lobe (2.2) has a transverse opening angle (64) of at least 90°, preferably at least 120°.

11. The radar system according to claim 9, characterized in that the at least one identification sensor (2.1, 20.1) is arranged on the stator (4.1).

12. The radar system according to claim 9, characterized in that the radar system (100) has at least one identification computing unit (4.3.1, 4.3.2) which is designed to identify a radar signature of a reflected identification signal.

13. The radar system according to claim 9, characterized in that the radar system (100) has a central computing unit (5) which is designed to assign the reflected identification signal to the reflected localization signals (71.1, 71.2).

* * * * *